(12) United States Patent
Nuzzo et al.

(10) Patent No.: US 11,236,005 B2
(45) Date of Patent: Feb. 1, 2022

(54) DEVICE AND METHOD FOR THE CONTINUOUS HEAT TREATMENT OF PHARMACEUTICAL GLASS CONTAINERS

(71) Applicant: SCHOTT Schweiz AG, St. Gallen (CH)

(72) Inventors: Daniele Nuzzo, Frasnacht (CH); Roman Huhn, St. Gallen (CH); Christian Hahn, Goldach (CH)

(73) Assignee: SCHOTT SCHWEIZ AG, St. Gallen (CH)

( * ) Notice: Subject to any disclaimer, the term of this patent is extended or adjusted under 35 U.S.C. 154(b) by 0 days.

(21) Appl. No.: 16/939,156

(22) Filed: Jul. 27, 2020

(65) Prior Publication Data
US 2020/0354258 A1  Nov. 12, 2020

Related U.S. Application Data

(63) Continuation of application No. PCT/EP2019/051683, filed on Jan. 24, 2019.

(30) Foreign Application Priority Data

Jan. 26, 2018 (DE) .................. 10 2018 101 839.8

(51) Int. Cl.
*C03B 25/06* (2006.01)
(52) U.S. Cl.
CPC .................... *C03B 25/06* (2013.01)
(58) Field of Classification Search
CPC ...... C03B 25/06; C03B 27/012; C03B 27/067
See application file for complete search history.

(56) References Cited

U.S. PATENT DOCUMENTS 1,071,331 A  8/1913 Mulholland
1,635,861 A *  7/1927 Peiler .............. C03B 25/06
                                                        432/155
(Continued)

FOREIGN PATENT DOCUMENTS

EP      0960863      12/1999
FR      931464       2/1948
(Continued)

OTHER PUBLICATIONS

International Search Report dated May 13, 2019 for International Application No. PCT/EP2019/051683.
(Continued)

*Primary Examiner* — Cynthia Szewczyk
(74) *Attorney, Agent, or Firm* — Ohlandt, Greeley, Ruggiero & Perle, L.L.P.

(57) ABSTRACT

A method and device for the continuous heat treatment of pharmaceutical glass containers are provided. The method includes continuously conveying glass containers from an entry region to an exit region via a conveying installation having a separating plate made from an electrically conductive material, the separating plate being positioned above and/or below the conveying installation; heating the glass containers to a maximum temperature in a heating zone after passing the entry region; cooling the glass containers in a first cooling zone after passing the heating zone and before passing the exit region at a first cooling rate, wherein the separating plate separates the glass containers from heating installations in the heating zone and/or temperature changing installations in the first cooling zone; and controlling the heating installations and/or the temperature changing installations to inductively heat the separating plate in the heating zone and/or the first cooling zone.

20 Claims, 3 Drawing Sheets

(56) References Cited

U.S. PATENT DOCUMENTS 1,756,244 A * 4/1930 Howard .................. C03B 25/06
                                                      65/349
1,974,058 A    9/1934  Wadman
3,259,481 A    7/1966  Fuller
3,797,567 A    3/1974  Wolf

FOREIGN PATENT DOCUMENTS

GB       169537      10/1921
JP     2004345916    12/2004

OTHER PUBLICATIONS

English translation of Written Opinion dated May 13, 2019 for International Application No. PCT/EP2019/051683, 4 pages.
International Preliminary Report on Patentability dated Jul. 28, 2020 for International Application No. PCT/EP2019/051683 with English translation, 10 pages.

* cited by examiner

DEVICE AND METHOD FOR THE CONTINUOUS HEAT TREATMENT OF PHARMACEUTICAL GLASS CONTAINERS

CROSS REFERENCE TO RELATED APPLICATIONS

This application is a continuation of international application PCT/EP2019/051683 filed Jan. 24, 2019, which claims the benefit of German application 10 2018 101 839.8 filed on Jan. 26, 2018, the entire contents of both of which are explicitly incorporated herein by reference.

BACKGROUND

1. Field of the Invention

The present invention relates generally to the production of pharmaceutical glass containers as primary packing means for pharmaceutical active ingredients for example of glass bottles (vials), cartridges, or syringe bodies, and relates in particular to a device and a method for relaxing such glass containers.

2. Description of Related Art

Methods for the continuous heat treatment of pharmaceutical glass containers in order for residual stresses in the glass material to be dissipated in a targeted manner are known from the prior art. To this end, the glass containers initially typically pass through a heating zone in which the glass containers are heated to a maximum temperature. The glass containers subsequently cool to room temperature without active cooling measures. However, the conditions when cooling without active cooling measures are not controlled in an open-loop manner.

FIG. 1 shows a typical temperature profile which the glass containers herein pass through in a relaxation oven according to the prior art, for example subsequently to a hot forming process in which the glass containers are produced from glass tubes by hot forming. The temperature in the heating zone and cooling zone herein is illustrated so as to be plotted over time in FIG. 1, wherein the afore-mentioned temperature must not be confused with the actual temperature of the glass containers.

At the beginning of the heat treatment, the glass containers herein are often already almost at room temperature again. Upon running into an entry region (period t0 to t1), the temperature in the heating zone I is ramped up as fast as possible until a maximum temperature has been reached, the latter in the case of a borosilicate glass being approximately 615° C., for example. For glass vials having a nominal volume of 2 ml, for example, said maximum temperature is maintained during approximately 29 s (zone II, period t2 to t3), thus during a very short time, so that it is reliably prevented that the glass temperature is above the glass transition temperature (Tg) for too long. The temperature in the zone III is subsequently ramped down at a substantially constant cooling rate (period t3 to t4), this in FIG. 1 being illustrated by a linear temperature profile. For glass vials having a nominal volume of 2 ml, this cooling takes for example approximately 340 s.

EP 0 960 863 A2 discloses a device for the continuous heat treatment of pharmaceutical glass containers in which device the glass containers between an entry region and an exit region are conveyed by means of a specially designed conveyor belt. The glass containers herein pass through a first heating zone in which the glass containers are heated to a maximum temperature, and subsequently thereto pass through a cooling zone in which the glass containers are to rapidly cool. An active ventilation in the cooling zone is used here in order for the cooling rate to be increased.

U.S. Pat. No. 3,259,481 A discloses a device for the continuous heat treatment of glass containers. The glass material to be cooled is brought to a very high temperature in a first region. Cooling at a first cooling rate which gradually decreases is subsequently performed. Cooling at a higher cooling rate is subsequently performed. The use of separating plates that are capable of being inductively heated is not disclosed.

U.S. Pat. No. 1,974,058 A discloses a comparable device. The use of separating plates that are capable of being inductively heated is not disclosed.

U.S. Pat. No. 1,071,331 A discloses a further device for the continuous heat treatment of glass containers that is conceived as a heat tunnel.

The heating elements for heating the glass containers are usually disposed at a minor spacing directly above the conveyor belt. Temperature variations of the heating elements therefore lead directly to process variations when relaxing the glass containers. Because the heating elements in the direct environment thereof cause very high temperature gradients, the requirements set for the neighboring materials are also very high, this often resulting in material flaking from and contaminations of the glass containers guided therebelow.

With a view to the further increasing requirements set for the product quality of glass containers for use as primary packing means for pharmaceutical active ingredients, attention must however also be paid to a suitable stress profile in the material of the glass containers.

There thus exists further room for improvement in the continuous heat treatment of pharmaceutical glass containers

SUMMARY

It is an object of the present invention to further improve the conditions in the continuous heat treatment of pharmaceutical glass containers. It is in particular an object of the present invention to provide an improved method and an improved device for the continuous heat treatment of pharmaceutical glass containers, by way of which a heat treatment is possible at consistent conditions with a reduced risk of contaminations.

According to the present invention, a method for the continuous heat treatment of pharmaceutical glass containers is provided in which method the glass containers by means of a conveying installation are continuously conveyed from an entry region to an exit region, wherein the glass containers between the entry region and the exit region first pass through a heating zone in which the glass containers are heated to a maximum temperature, and subsequently to the heating zone pass through a first cooling zone in which the glass containers cool at a first cooling rate.

According to the invention, at least one separating plate made from an electrically conductive material which for separating the glass containers in the heating zone and at least in the first cooling zone from heating installations or combined heating and cooling installations and for preventing an ingress of contaminations into the conveying gap is provided above the conveying installation or above and below the conveying installation, wherein the at least one separating plate is inductively heated by the heating installations or combined heating and cooling installations so as to supply heat to the glass containers in the heating zone and at least in the first cooling zone.

According to the invention, no contaminations, for example material flakes of heating elements or the direct environment thereof, can thus come into contact with the glass containers. Contaminations or even mechanical damage to the glass containers can thus be effectively prevented. For this purpose, at least the separating plate above the conveying installation is preferably configured so as to be continuous and without interruptions or openings.

The separating plates herein are composed of an electrically conductive material, in particularly from a current-conducting metal, so that said separating plates can be heated inductively, by way of the eddy current losses generated therein, by the heating installations or combined heating and cooling installations. The heating elements can thus be disposed directly above or below, respectively, the moving glass containers so as to cover a comparatively narrow conveying gap and to spatially separate said conveying gap from the heating installations or combined heating and cooling installations. The comparatively minor spacing assists in saving energy costs and minimizes temporal delays when controlling the temperature profiles in a closed-loop or open-loop manner. In the case of inductive heating being chosen, particularly aggressive temperature profiles having high temperature variation rates can in particular be implemented in order for the glass containers be very rapidly heated in the heating zone and the first cooling zone.

According to a further embodiment, the glass containers subsequently to the first cooling zone and prior to reaching the exit region pass through a second cooling zone in which the glass containers cool at a second cooling rate which is higher than the first cooling rate.

By using two directly successive cooling zones the conditions when relaxing the glass containers can be set in a more suitable manner. Attention herein is paid on the cooling of the glass containers at temperatures above the lower annealing point being performed in a relatively slow manner, because the plasticity of the glass in this temperature range is increasingly lost during cooling. Consequently, the cooling of the glass has to be performed in as homogenous a manner as possible in order for no new internal stresses be incorporated in the glass. After undershooting the lower annealing point the glass henceforth can only deform in an elastic manner, so to speak, so that a very much higher second cooling rate can be set according to the invention after the lower annealing point has been undershot. The first cooling rate in the first cooling zone is thus chosen so as to be relatively low so that almost no new internal stresses are incorporated into the glass on account of an excessively rapid cooling. The thermal conditions in the first cooling zone are in particular expediently chosen such that no new (secondary) internal stresses are induced on account of an excessively rapid cooling when passing through the first cooling zone. In particular also such that the residual stress in the glass containers when exiting the first cooling zone does not exceed a limit value of 2-3 MPa.

Upon exiting the first cooling zone, thus once the temperature of the glass containers has slightly undershot the lower annealing point, a significantly higher second cooling rate is chosen such that the glass containers are cooled to approximately room temperature, in particular to a temperature in a range between approximately 20° C. and approximately 100° C., as rapidly as possible but without any build-up of additional stresses in the material.

According to the invention, the overall length of the relaxation oven can be minimized in this way. Taking into account that the glass containers pass through the relaxation oven by means of a conveyor belt at a constant speed, a shorter overall time for relaxation corresponds to a shorter overall length of the relaxation oven, which assists in saving space. This space saving according to the invention can be significant.

However, the duration required for suitably changing process parameters of the hot forming machine situated upstream by means of the results of an inspection of the cooled glass containers, in particular of a video inspection, which is performed downstream of the relaxation oven, when this is deemed necessary by means of the results of the inspection, can also be reduced in this way. Up to the point of inspection a multiplicity of glass containers have already passed through the relaxation oven, said glass containers optionally not being of a suitable quality. Because it is possible to react faster through quality variations of the glass containers by virtue of the shorter overall length of the relaxation oven according to the invention, the amount of rejects can thus also be reduced according to the invention, and a consistently high quality of the glass containers can be guaranteed.

According to a further embodiment, the separating plate for supplying heat to the glass containers in the heating zone and at least in the first cooling zone is inductively heated by the heating installations or combined heating and cooling installations. The separating plates by virtue of the relatively high mass thereof lead to a further homogenization of the temperature conditions in the conveying direction of the glass containers as well as perpendicularly to said conveying direction. According to the invention, temperature conditions which are much more homogenous can thus be set in the heating and cooling zones. To this end it is preferable for the separating plates to possess a sufficient thermal mass.

According to a further embodiment, the glass containers are heated in the heating zone such that the temperature of the glass containers for a short time is higher than the glass transition temperature. Residual stresses in the glass can be particularly effectively dissipated in this range. The aforementioned period herein is in the magnitude of only a few seconds, and is, for example, at most 3 seconds, or more preferably at most 2 seconds, this depending on parameters of the glass containers, in particular on the wall thickness of said glass containers, thus on the duration until the very high temperature has also reached the internal surface of the glass containers.

According to a further embodiment, the ambient temperature in the heating zone is at least 65° C., more preferably at least 85° C., higher than the glass transition temperature. In the case of a borosilicate glass, the ambient temperature in the heating zone can be at least 590° C. and more preferably at least 605° C. For vials, suitable ambient temperatures in the range from 630° C. to 660° C. in the heating zone have been determined by experiments, this being in particular also dependent on the vial size and the cycle rate, this corresponding to a temperature differential of 65° C. to 95° C. in relation to Tg (565° C.). By of the aggressively implemented temperature conditions the glass containers reach the maximum temperature thereof particularly rapidly, this resulting in a further reduction in the overall length of the relaxation oven. The temperature in the heating zone which the glass containers pass through here in can be higher than the glass transition temperature during a duration of at most 25 s, more preferably during a duration of at most 20 s.

According to a further embodiment, the glass containers in the first cooling zone cool to a temperature which corresponds to the lower annealing point or slightly under shoots the latter, for example by a few ° C. More specifically, the temperature profile in the first cooling zone, the overall length of the first cooling zone, and the conveying speed of the glass containers are mutually adapted such that the lower annealing point is reached toward the end of the first cooling zone. The overall length of the first cooling zone can thus also be further reduced. The temperature profile in the first cooling zone herein is expediently chosen such that residual stresses in the glass do not exceed a predetermined limit value of, for example, 2-3 MPa.

According to a further embodiment, the first cooling zone is subdivided into at least two, preferably into at least three, cooling sub-zones having in each case constant temperatures of the assigned combined heating and cooling installations, the temperature of the glass containers in said cooling sub-zones being lowered step-by-step to the range of the lower annealing point.

According to a further embodiment, the cooling is sub-zones of the first cooling zone are mutually thermally separated for example by means of separations in the form of sheet-metal panels or plates which are conceived for preventing or at least significantly minimizing a convection between the cooling sub-zones such that the temperatures of sub-zones of the first cooling zone thus formed can be set in a substantially mutually independent manner. A temperature differential between the ambient temperature in a first cooling sub-zone, when viewed in the conveying direction, and the ambient temperature in the heating zone herein is greater than a temperature differential between the ambient temperature in the first cooling sub-zone, when viewed in the conveying direction, and a neighboring second cooling sub-zone, or a temperature differential of the ambient temperatures in two neighboring cooling sub-zones. In other words, the glass containers in terms of temperature are subjected to the greatest temperature leap in the first sub-zone of the first cooling zone, when viewed in the conveying direction. The glass containers when entering the subsequent sub-zones of the first cooling zone in terms of temperature are subjected to further temperature leaps, the latter however becoming in each case smaller.

According to a further embodiment, the temperature in the first cooling zone, in particular in the cooling sub-zones of the first cooling zone, is lowered not by active cooling, for example by a cooling airflow. Rather, the temperature is suitably set by controlling in a closed-loop manner heating installations above and below the conveying installation.

According to a further embodiment, the second cooling rate in the second cooling zone is set such that the build-up of additional stresses in the glass of the glass containers when cooling in the second cooling zone is avoided.

According to a further embodiment, the temperature in the second cooling zone is lowered actively by an airflow in a closed air circuit. The overall length of the second cooling zone can thus be further reduced, because higher cooling rates can be achieved by way of active cooling by an airflow. For this purpose, an airflow is preferably suitably guided through the second cooling zone and controlled in an open-loop manner or in a closed-loop manner. The second cooling rate herein can be suitably set by varying an airflow in the closed air circuit and/or by additionally switching heat exchangers. Furthermore, an air flow in the closed air circuit can be filtered for reducing a particle load in the second cooling zone.

According to a further embodiment, a dwell time of the glass containers in the first cooling zone is in the range between 73 s and 93 s, more preferably in the range between 78 s and 88 s. The dwell time of the glass containers in the second cooling zone herein can be in the range between 87 s and 117 s, more preferably in the range between 95 s and 109 s.

According to a further aspect of the present invention, a corresponding device for the method of the present invention is also disclosed herein.

A further aspect of the present invention relates to the use of a method or a device, respectively, as disclosed herein, for the continuous heat treatment of pharmaceutical glass containers, in particular of vials, cartridges, or syringe bodies from glass.

BRIEF DESCRIPTION OF THE FIGURES

The invention will be described hereunder in an exemplary manner and with reference to the appended drawings, further features, advantages, and objects to be achieved being derived therefrom. In the drawings.

In the figures, identical reference signs refer to identical elements or groups of elements, or to elements or groups of elements of substantially identical function.

DETAILED DESCRIPTION

Figure 3:
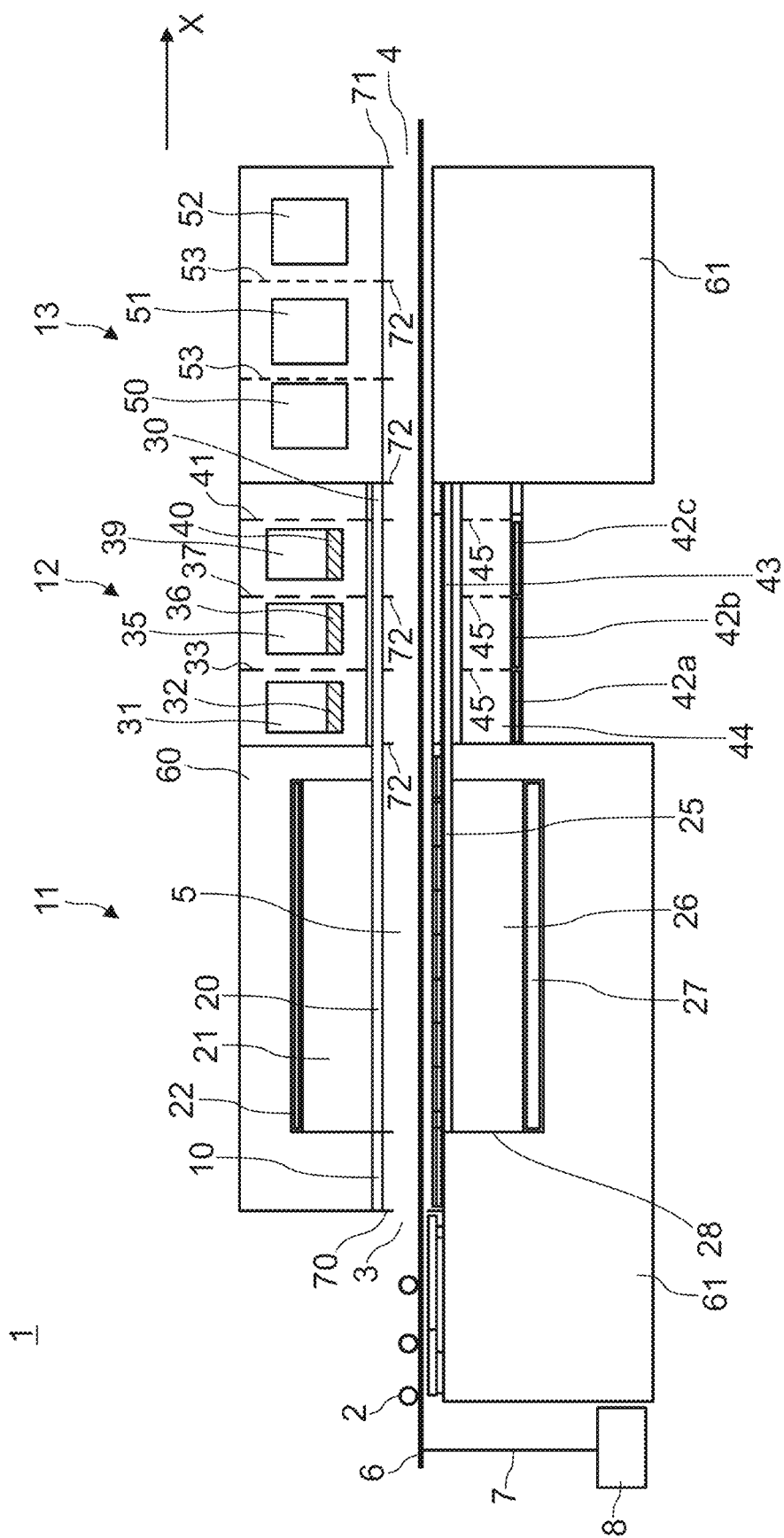
FIG. 3 in a schematic lateral view shows a device for the continuous heat treatment of pharmaceutical glass containers according to the present invention.

The general construction of a device for the continuous heat treatment of pharmaceutical glass containers according to the present invention is first described by means of FIG. 3 by means of a schematic a lateral view.

For the continuous heat treatment, the glass containers 2 on a conveyor belt 6 pass through a relaxation oven 1, from left to right in the conveying direction x in FIG. 3. The conveyor belt 6 is mechanically coupled to the drive motor 8. The conveying speed is expediently constant, can however be suitably set.

The glass containers 2 in the entry region 3 are substantially at room temperature, depending on the spacing from the hot forming device (not shown) which is disposed upstream and in which the glass containers 2 are produced from a glass tube by hot forming. The glass containers 2 on the conveying section thereof through the relaxation oven 1 pass through a gap 5 of minor height. Zones having dissimilar temperatures are disposed along the conveying section, as is explained hereunder. Apertures 72 which in any case are disposed above the conveying installation ensure a thermal separation of the different thermal zones 11-13 in the relaxation oven. To this end, the apertures in the vertical direction form comparatively narrow gaps between the individual zones 11-13. Thermal sub-zones can also be configured within the zones 11-13, as is described hereunder. After passing through the relaxation oven 1, the glass containers 2 exit the relaxation oven 1 in the exit region 4.

After entering the relaxation oven 1, the glass containers 2 first pass through a relatively short pre-heating zone 10 before said glass containers 2 make their way into the heating zone 11. Heating elements 22, 27 are disposed above and below the conveying installation. According to the invention, the heating elements 22, 27 are not disposed so as to be in direct proximity to the conveying installation 6 so as to impart the heat directly to the glass containers 2 in a conventional manner. Rather, according to the invention, the spacing between the heating elements 22, 27 and the conveying installation 6 is comparatively large such that a heating space 21, 26 which serves for further homogenizing the temperature conditions is configured between the heating elements 22, 27 and the conveying installation 6. The heating spaces 22, 27 are spatially separated from the conveying installation 6 by way of a respective heating or separating plate 20, 25. No contaminations such as, for example, material flakes, can thus in particular make their way from the heating elements 22, 27 onto the conveying installation 6 and the glass containers 2 situated on the latter, so that the ingress of contaminations into the glass containers 2 is prevented. The heating or separating plates 20, 25 possess a sufficient thermal mass for homogenizing the temperature conditions in the conveying direction x and transversely to the latter in the region of the heating zone 11. To this end, the heating or separating plates 20, 25 can in particular be composed of a metal with a high electrical conductivity and thermal conductivity. The heating or separating plates 20, 25 are particularly preferably inductively heated by means of the heating elements 22, 25 by way of the eddy current losses generated therein.

According to a preferred embodiment, a heating or separating plate 20, as illustrated in FIG. 3, for preventing the ingress of contaminations which drop from above into the glass containers 2 is disposed in the heating zone 11 at least above the conveying installation 6 according to the present invention. According to an alternative embodiment, a heating or separating plate 25, as illustrated in FIG. 3, for protecting the glass containers 2 in relation to the ingress of contaminations is disposed in the heating zone 11 at least below the conveying installation 6. According to a further embodiment, heating or separating plates 20, 25, as illustrated in FIG. 3, can be disposed in the heating zone 11 above the conveying installation 6 as well as below the conveying installation 6. At least the separating plate 20 which is disposed above the conveying installation 6 herein is in any case configured so as to be continuous above the conveying installation 6 and without interruptions or openings. More preferably, both separating plates 20, 25 in this context are configured so as to be continuous and without interruptions or openings.

The temperatures of the heating elements 22, 27, when viewed in the conveying direction x, can be constant in the heating zone 11 such that the temperature of the moving glass containers 2 are heated at a constant heating rate. In principle, the heating elements 22, 27 in the heating zone 11 can also implement a ramp-shaped temperature profile in the conveying direction x, for example. The heating elements 22, 27 in the heating zone 11 are operated so as to cause heating of the glass containers 2 that is as fast as possible, this contributing toward reducing the overall length of the relaxation oven in the conveying direction x. The length of the heating zone 11 is dimensioned such and conveying speed of the conveying installation is chosen such that the glass containers have reached the desired temperature at the end of the heating zone 11.

Subsequently to the heating zone 11, the glass containers 2 pass through a first cooling zone 12 in which the glass containers 2 cool at a first cooling rate. As can be derived from FIG. 3, the heating and cooling modules 31, 35, 40 in the first cooling zone 12 form, for example, three successive thermal zones which in the manner described above are thermally mutually separated in the best possible manner by means of apertures 72 and separations 33, 37, 41. The heating and cooling modules 31, 35, 40 and the heating elements 42a-42c also in the first cooling zone 12 are expediently not disposed directly above or below the conveying installation 6, respectively. Rather, the heating and cooling modules 31, 35, 40 and the heating elements 42a-42c are spatially separated from the conveying installation 6 by way of a respective heating or separating plate 30, 43. In particular, no contaminations such as, for example, material flakes, can thus make their way from the heating and cooling modules 31, 35, 40 and the heating elements 42a-42c onto the conveying installation 6 and the glass containers 2 situated thereon, so that the ingress of contaminations into the glass containers 2 is prevented. The heating or separating plates 30, 43 possess a sufficient thermal mass for homogenizing the temperature conditions in the conveying direction x and transversely to the latter in the region of the heating zone 11. To this end, the heating or separating plate 30, 43 can in particular be composed of a metal with a high electrical conductivity and thermal conductivity. In principle, the heating and cooling modules 31, 35, 40 and the heating elements 42a-42c can heat the heating or separating plates 30, 43 inductively by way of eddy current losses also in the first cooling zone 12.

According to a preferred embodiment, a heating or separating plate 30, as illustrated in FIG. 3, for preventing the ingress of contaminations which drop from above into the glass containers 2 is disposed according to the present invention first cooling zone 12 at least above the conveying installation 6. According to an alternative embodiment, a heating separating plate 43, as illustrated in FIG. 3, for protecting the glass containers 2 in relation to the ingress of contaminations is disposed first cooling zone 12 at least below the conveying installation 6. According to a further embodiment, heating or separating plates 30, 43, as illustrated in FIG. 3, first cooling zone 12 can be disposed above the conveying installation 6 as well as below the conveying installation 6. At least the separating plate 30 herein, which is disposed above the conveying installation 6, is in any case configured so as to be continuous above the conveying installation 6 and without interruptions or openings. More preferably, both separating plates 30, 43 in this context are configured so as to be continuous and without interruptions or openings.

As is explained hereunder, the temperature in the first cooling zone 12 is lowered step-by-step, by way of a number of steps which corresponds to the number of zones in the first cooling zone 12.

Subsequently to the first cooling zone 12, the glass containers 2 pass through a second cooling zone 13 in which the glass containers 2 cool at a second cooling rate which is higher than the first cooling rate. As can be derived from FIG. 3, the cooling modules 50-52 in the second cooling zone 13 form three successive thermal zones which are mutually thermally separated in the best possible manner as described above by means of apertures 72 and separations 53. The cooling modules 50-52 can be spatially separated from the conveying installation by way of a separation plate also in the second cooling zone 13, so that no contaminations can make their way onto the conveying installation 6 and the glass containers 2 situated thereon, and the ingress of contaminations into the glass containers 2 is prevented. Cooling air for increasing the second cooling rate can circulate in the cooling modules 50-52. The air flow rate herein can be suitably set with the aid of valves or flaps, or else by means of a fan having a variable output. The air management in the second cooling zone 13 is expedient such that cooling air does not directly flow on the glass containers, so as to prevent the ingress of contaminations into the glass containers 2.

It is to be pointed out that the cooling process is controlled in a closed-loop manner and is subject to certain variations in temperature, said variations indeed being relatively minor but over time being slightly (dynamically) variable. The "first" or "second" cooling rate, respectively, explained above is thus not constant throughout but comprises certain minimum variations which however are relatively minor in comparison to the respective cooling rate. Said dynamic results in particular from the principle of controlling in a closed-loop manner the temperature in the different zones (dual-point closed-loop control) and from the property of the glass or of the class container be cooled, respectively. Variations in the glass thickness or variations in the wall thickness of the glass containers can thus cause varying radiation heat being emitted, the latter being detected by thermal elements in the respective temperature zones, this being equalized by suitably controlling in a closed-loop manner of the temperatures in the respective temperature zones and leading to certain variations in the cooling rates.

Figure 1:
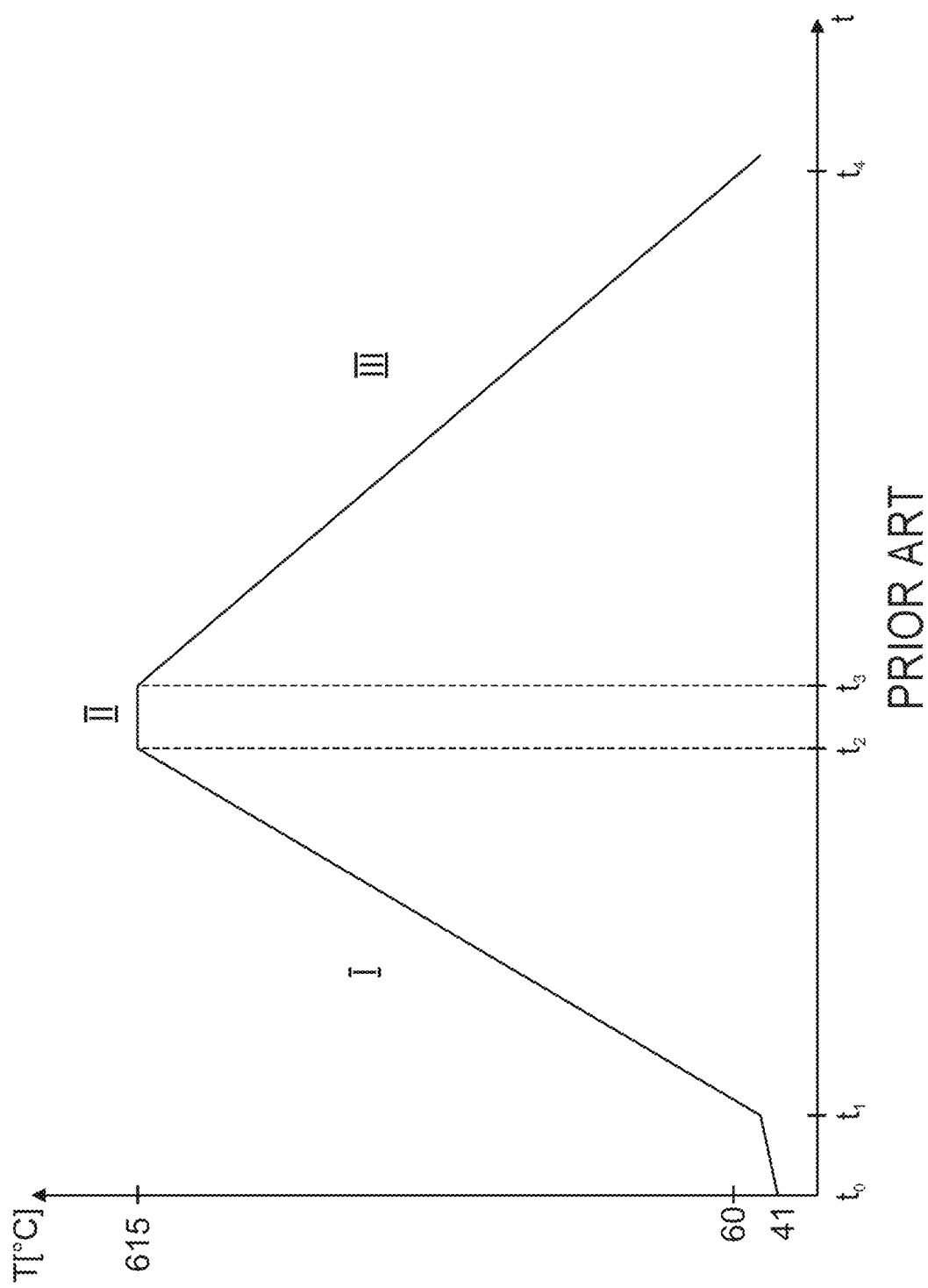
FIG. 1 shows a temperature profile in the case of a method for the continuous heat treatment of pharmaceutical glass containers according to the prior art.
Figure 2:
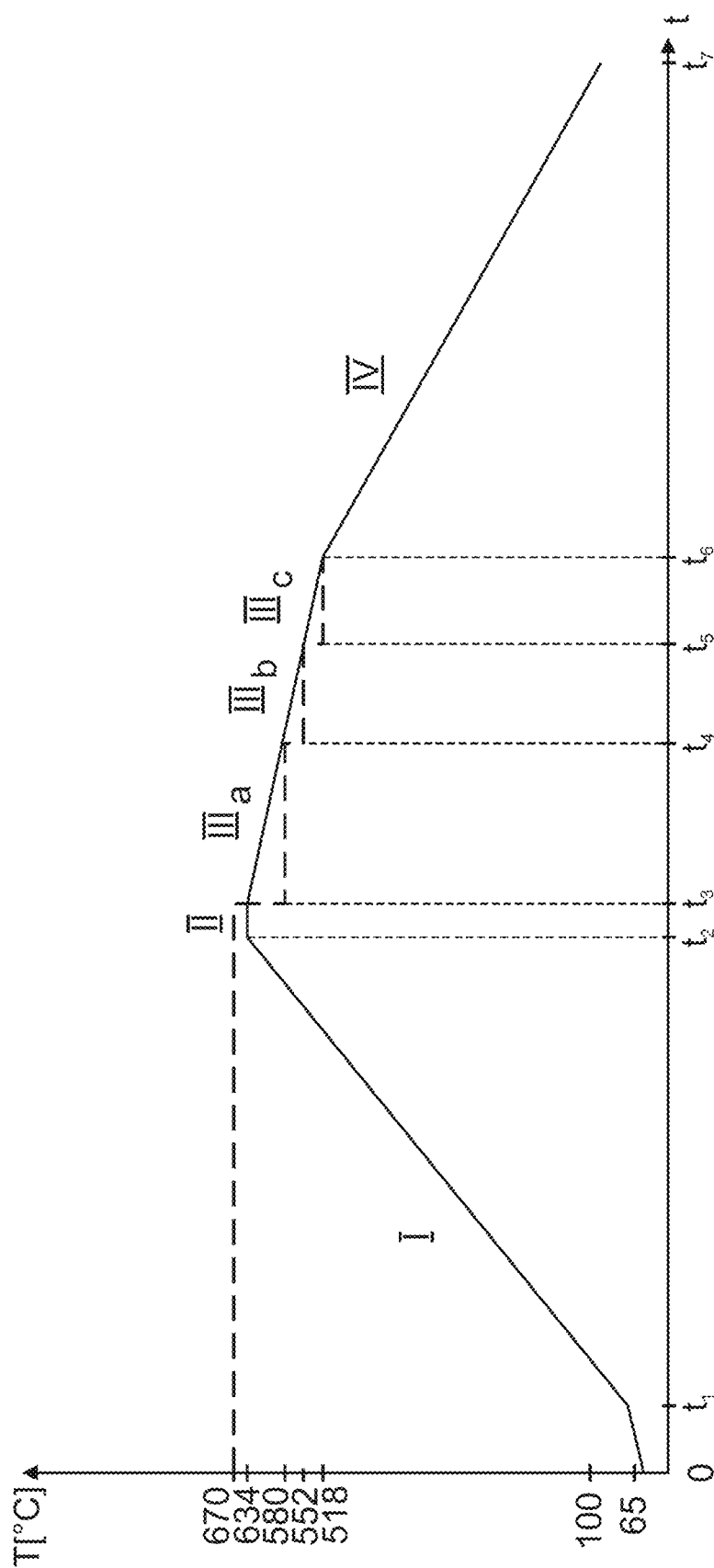
FIG. 2 shows a temperature profile in the case of a method for the continuous heat treatment of pharmaceutical glass containers according to the present invention.

A temperature profile in the case of a method for the continuous heat treatment of pharmaceutical glass containers according to the present invention is described hereunder by means of FIG. 2. FIG. 2 herein is based on the heat treatment of glass vials from Fiolax®, having a glass transition temperature ($T_g$) of approximately 565° C. Illustrated in FIG. 2 are the temperatures of the glass containers (solid line) and the ambient temperature in the respective thermal zone (dashed line) which can be identical to the temperature in the heating space between the assigned heating installation and the separating or heating plate. The temperature illustrated in dashed lines herein corresponds substantially to the temperature on the external surface of the glass containers but not to an equilibrium temperature in the glass volume of the glass containers because the glass containers are conveyed relatively rapidly through the thermal zones.

After passing through the pre-heating zone (time interval 0 to t1), the temperature of the glass containers in the heating zone I is preferably ramped up in a linear manner to a maximum temperature which is approximately 634° C. More specifically, said temperature is reached toward the end of the heating zone I and is kept constant during a predetermined time interval II (t2 to t3), this being able to be implemented by adapting the heating conditions at the end of the heating zone. The glass containers are held at said maximum temperature only for a very short time of, for example, 2 s.

The glass containers subsequently enter the first sub-zone IIIa of the cooling zone. The ambient temperature in the assigned heating space in said sub-zone IIIa between a first heating and cooling modules 31 (cf. FIG. 3) and the separating plate 30 situated therebelow, as well as between the heating element 42a below the conveying installation 6 and the separating plate 43 situated therebetween, is approximately 580° C. The duration t3 to t4 corresponds to approximately 40 s and is longer than the durations t4 to t5 and t5 to t6 which is required for passing through the subsequent sub-zones IIIb and IIIc.

The glass containers subsequently enter the second sub-zone IIIb of the first cooling zone. The ambient temperature in the assigned heating space in said sub-zone IIIb between the second heating and cooling modules 35 (cf. FIG. 3) and the separating plate 30 situated therebelow, and between the heating element 42b below the conveying installation 6 and the separating plate 43 situated therebetween, is approximately 550° C. The duration t4 to t5 corresponds to approximately 22 s and is shorter than the duration t3 to t4 but approximately identical in length to the duration t5 to t6.

The glass containers subsequently enter the third sub-zone IIIc of the first cooling zone. The ambient temperature in the assigned heating space in said sub-zone IIIc between the third heating and cooling modules 40 (cf. FIG. 3) and the separating plate situated therebelow, and between the heating element 42c below the conveying installation 6 and the separating plate 43 situated therebetween, is approximately 518° C. The duration t5 to t6 corresponds to approximately 21 s and is shorter than the duration t3 to t4 but approximately identical in length to the duration t4 to t5.

Toward the end of the first cooling zone the temperature of the glass containers has reached the lower annealing point or has slightly undershot the latter. The plasticity of the glass during the cooling is increasingly lost above the lower annealing point, and cooling of the glass that is as homogenous as possible must consequently be performed. Therefore, the first cooling rate in the first cooling zone is chosen so as to be relatively low such that almost no new (secondary) internal stresses are incorporated into the glass on account of excessively rapid cooling. The thermal conditions in the first cooling zone are in particular chosen such that the residual stress in the glass containers when exiting the first cooling zone does not exceed a limit value of 2-3 MPa.

Attention is paid herein to the cooling of the glass containers at temperatures above the lower annealing point being performed relatively slowly, because the plasticity of the glass in this temperature range is increasingly lost during cooling. After undershooting the lower annealing point the glass henceforth can only deform in a elastic manner, so to speak, so that a very much higher second cooling rate can be set according to the invention after the lower annealing point has been undershot.

After exiting the first cooling zone, thus once the temperature of the glass container has slightly undershot the lower annealing point, a significantly higher second cooling rate is chosen such that the glass containers are cooled as rapidly as possible, but without the build-up of additional stresses in the material, to room temperature or to a temperature in the range between approximately 20° C. and approximately 100° C. The overall length of the relaxation oven can thus be minimized, this not only assisting in saving space but also reducing the duration which is required for suitably changing process parameters of the hot forming machine situated upstream by means of the results of an inspection of the cooled glass containers, in particular means of a video inspection of the cooled glass containers. The amount of rejects can thus also be reduced according to the invention, and a consistently high quality of the glass containers can be guaranteed.

The duration t6 to t7 for passing through the second cooling zone IV according to FIG. 2 is approximately 102 s.

As can be derived from FIG. 2, cooling is preferably exclusively performed the second cooling zone IV so that an ambient temperature of the heating space is no longer illustrated for the second cooling zone IV.

As can be derived from FIGS. 2 and 3, the ambient temperature in the heating space 21, 26 of the heating zone 11 is at least 65° C., more preferably at least 85° C., higher than the glass transition temperature ($T_g$). In the case of a borosilicate glass the ambient temperature in the heating zone can be at least 590° C. and more preferably the 605° C. For vials, suitable ambient temperatures in the range from 630° C. to 660° C. in the heating zone have been determined by experiments, this being in particular also dependent on the vial size and the cycle rate, this corresponding to a temperature differential of 65° C. to 95° C. in relation to Tg (565° C.).

The temperature of the glass containers 2, in particular a surface temperature of the glass containers 2, in the heating zone 11 herein during a duration of at most 25 s, more preferably during a duration of at most 20 s, is higher than the glass transition temperature ($T_g$).

The first cooling zone 12 in the case of the exemplary embodiment illustrated is subdivided into three cooling sub-zones IIa, IIb, IIc having in each case constant ambient temperatures in the sub-zones or assigned heating spaces, respectively. The temperature of the glass containers 2 in the cooling sub-zones IIa, IIb, IIc is lowered step-by-step to the lower annealing point. The temperature differential between the ambient temperature in the first cooling sub-zone IIa, or the ambient temperature of the heating space of the first combined heating and cooling installation 31, when viewed in the conveying direction (x), respectively, and the ambient temperature in the heating zone 11 is greater than the temperature differential between the ambient temperature in the two cooling sub-zones IIa, IIb, or the ambient temperature of the heating spaces of the first combined heating and cooling installation 31, when viewed in the conveying direction (x), respectively, and the neighboring second combined heating and cooling installation 35, or the temperature differential of the ambient temperatures of arbitrary further pairs of neighboring cooling sub-zones or of ambient temperatures of combined heating and cooling installations (35, 39, for example), respectively.

As will be readily obvious to the person skilled in the art, the afore-mentioned method in analogous manner can also be applied to other types of glass vessels which are produced from glass tubes by hot forming, in particular generally in the context of the production of glass packaging means also having larger dimensions than usual for storing pharmaceutical active ingredients.

LIST OF REFERENCE SIGNS

| | |
|---|---|
| 1 | Relaxation oven |
| 2 | Glass container |
| 3 | Entry region |
| 4 | Exit region |
| 5 | Gap |
| 6 | Conveying installation |
| 7 | Coupling |
| 8 | Drive motor |
| 10 | Pre-heating zone |
| 11 | Heating zone |
| 12 | First cooling zone |
| 13 | Second cooling zone |
| 20 | Heating plate |
| 21 | Heating space |
| 22 | Heating element |
| 23 | Upper housing |
| 25 | Heating plate |
| 26 | Heating space |
| 27 | Heating element |
| 28 | Lower housing |
| 30 | Heating plate |
| 31 | First heating and cooling module |
| 32 | Heating element |
| 33 | Separation |
| 35 | Second heating and cooling module |
| 36 | Heating element |
| 37 | Separation |
| 39 | Third heating and cooling module |
| 40 | Heating element |
| 41 | Separation |
| 42a, 42b, 42c | Heating element |
| 43 | Heating plate |
| 44 | Internal volume |
| 45 | Separation |
| 50 | First cooling module |
| 51 | Second cooling module |
| 52 | Third cooling module |
| 53 | Separation |
| 60 | Housing |
| 61 | Housing |
| 70 | Entry aperture |
| 71 | Exit aperture |
| 82 | Aperture |
| x | Processing/conveying direction |

What is claimed is:

1. A method for the continuous heat treatment of pharmaceutical glass containers, comprising:
    continuously conveying glass containers from an entry region to an exit region via a conveying installation having a separating plate made from an electrically conductive material, the separating plate being positioned above and/or below the conveying installation;
    heating the glass containers to a maximum temperature in a heating zone after passing the entry region;
    cooling the glass containers in a first cooling zone after passing the heating zone and before passing the exit region at a first cooling rate, wherein the separating plate separates the glass containers from heating installations in the heating zone and/or temperature changing installations in the first cooling zone; and
    controlling the heating installations and/or the temperature changing installations to inductively heat the separating plate in the heating zone and/or the first cooling zone.

2. The method of claim 1, wherein the temperature changing installations in the first cooling zone are cooling installations.

3. The method of claim 1, wherein the temperature changing installation in the first cooling zone are combined heating and cooling installations.

4. The method of claim 3, further comprising controlling a temperature differential so that a first temperature differential between a temperature of the first combined heating and cooling installation of the first cooling zone, when viewed in a conveying direction and a temperature of the heating installations in the heating zone is greater than a second temperature differential between the temperature of the first combined heating and cooling installation, when viewed in the conveying direction, and a temperature of an immediately adjacent second combined heating and cooling installation.

5. The method of claim 3, further comprising controlling the temperature differential so that a first temperature differential between a temperature of the first combined heating and cooling installation of the first cooling zone, when viewed in a conveying direction and a temperature of the heating installations in the heating zone is greater than a second temperature differential of the temperatures between two immediately adjacent combined heating and cooling installations.

6. The method of claim 1, wherein the step of heating the glass containers comprises controlling the heating zone to an ambient temperature that is at least 70° C. higher than a glass transition temperature of the glass containers so that the maximum temperature of the glass containers in the heating zone is higher than the glass transition temperature for a duration of at most 25 seconds.

7. The method of claim 6, wherein the ambient temperature in the heating zone is at least 85° C. higher than the glass transition temperature.

8. The method of claim 6, wherein the duration is at most 20 seconds.

9. The method of claim 1, wherein the step of cooling the glass containers in the first cooling zone comprises cooling the glass containers to a temperature that corresponds to or slightly lower than the glass transition temperature.

10. The method of claim 9, wherein the step of cooling the glass containers in the first cooling zone further comprises cooling the temperature of the glass containers in steps to the temperature.

11. The method of claim 10, wherein the step of cooling the glass containers in the first cooling zone comprises cooling the temperature of the glass containers to a first temperature in a first cooling sub-zone and cooling the temperature of the glass containers to a second temperature in a second cooling sub-zone.

12. The method of claim 11, further comprising thermally separating the first and second cooling sub-zone.

13. The method of claim 1, further comprising cooling the glass containers in a second cooling zone after passing the first cooling zone and before passing the exit region at a second cooling rate, wherein the second cooling rate is higher than the first cooling rate.

14. The method of claim 13, further comprising controlling the second cooling rate to a rate sufficient to avoid build-up of additional stresses in the glass of the glass containers.

15. The method of claim 13, wherein the step of cooling the glass containers in the second cooling zone comprises controlling a closed air circuit to cool the glass containers.

16. The method of claim 15, further comprising varying an air flow and/or air temperature in the closed air circuit to establish the second cooling rate.

17. The method of claim 15, further comprising filtering an air flow in the closed air circuit to reduce a particle load in the second cooling zone.

18. The method of claim 13, wherein the glass containers have a dwell time in the first cooling zone between 73 and 93 seconds and a dwell time in the second cooling zone between 87 and 117 seconds.

19. A method for the continuous heat treatment of pharmaceutical glass containers, comprising:

continuously conveying glass containers from an entry region to an exit region via a conveying installation having a separating plate made from an electrically conductive material, the separating plate being positioned above and/or below the conveying installation;

heating the glass containers to a maximum temperature in a heating zone after passing the entry region;

cooling the glass containers in a first cooling zone after passing the heating zone and before passing the exit region at a first cooling rate, wherein the separating plate separates the glass containers from heating installations in the heating zone and/or temperature changing installations in the first cooling zone; and controlling a temperature differential so that a first temperature differential between a temperature of the first temperature adjusting installation of the first cooling zone, when viewed in a conveying direction, and a temperature of the heating installations in the heating zone is greater than a second temperature differential between the temperature of the first temperature adjusting installation, when viewed in the conveying direction, and a temperature of an immediately adjacent temperature adjusting installation.

20. A device for the continuous heat treatment of pharmaceutical glass products, comprising:

a housing having a continuous conveying gap between an entry region and an exit region;

a conveying installation configured so that the glass containers, without mutual contact, bear on an upper side of a driven conveyor and are continuously conveyed in a conveying direction conveyed from the entry region to the exit region;

a heating zone configured so that the glass containers, when passing through the conveying gap in the heating zone, are heated to a maximum temperature by heating installations;

a first cooling zone, when viewed in the conveying direction, directly adjoins the heating zone, the first cooling zone being configured so that the glass containers, when passing through the conveying gap in the first cooling zone, cool at a first cooling rate by temperature adjusting installations; and a separating plate positioned to separate the glass containers in the heating zone and the first cooling zone from the heating installations and/or the temperature adjusting installations, the separating plate being configured and positioned to prevent ingress of contaminations into the conveying gap, wherein the separating plate comprises an electrically conductive material, the heating installations and/or temperature adjusting installations being configured to selectively inductively heat the separating plate.

* * * * *